Nov. 1, 1966    I. MERLIS    3,282,972
METHOD FOR THE CONTINUOUS RENDERING OF ORGANIC MATERIAL
Filed Aug. 22, 1962    3 Sheets-Sheet 1

IRA MERLIS
INVENTOR

BY Mason, Porter, Diller & Stewart

ATTORNEYS

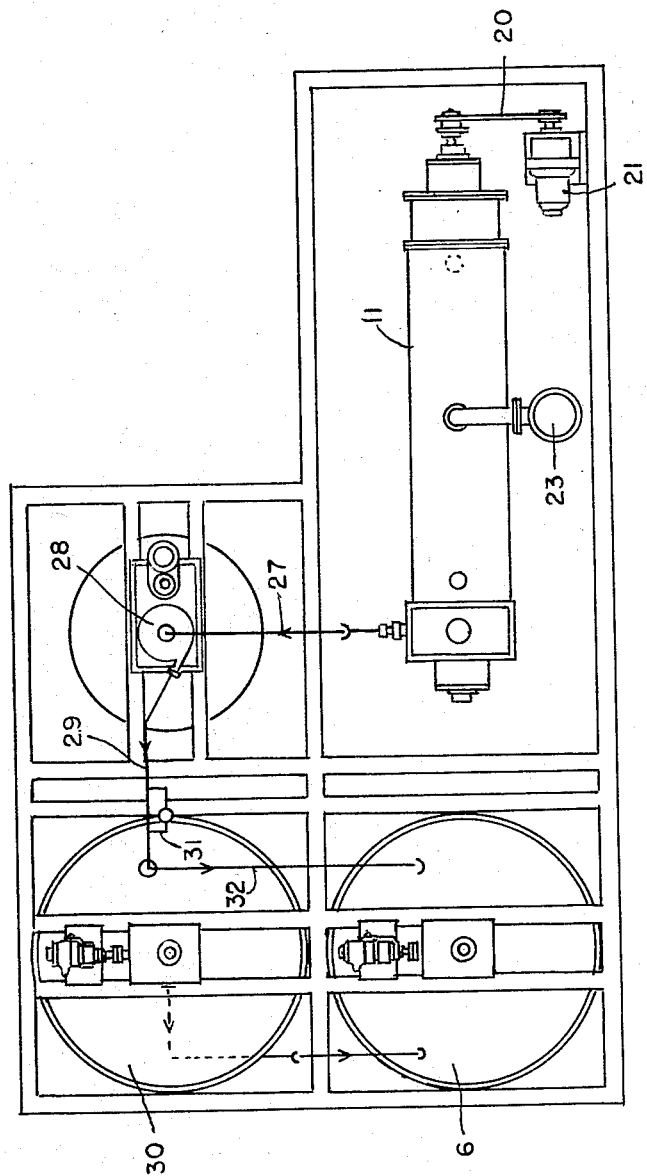

United States Patent Office 3,282,972
Patented Nov. 1, 1966

3,282,972
METHOD FOR THE CONTINUOUS RENDERING OF ORGANIC MATERIAL
Ira Merlis, Whitemarsh, Pa., assignor to Acme Process Equipment Company, Oreland, Pa., a corporation of Pennsylvania
Filed Aug. 22, 1962, Ser. No. 218,748
3 Claims. (Cl. 260—412.6)

The following specification relates to an improved method for the continuous dry rendering of offal and the like. It has evident advantages in replacing former batch processes by a continuous one, reducing the cost and time of processing and improving the several products.

The invention departs from the usual process in which refuse animal material is treated in batches by steam pressure cooking followed by mechanical separation of the meat tissue, the aqueous extracts and the supernatant tallow, other fats and oil.

One of the objects of the invention is to process the material continuously through specially designed equipment, thus reducing the handling of the material.

Another object of the invention is to reduce the initial cost of the equipment needed.

A further object of the invention is to reduce the time of processing by subjecting the material in thin layers or films to the processing heat for a limited time as contrasted with the usual slow cooking.

A still furthur object of the invention is to improve the products by the avoidance of extended contact with cooking surfaces.

Among the objects of the invention is to recycle a slurry of the processed or heated material with the raw material for the purpose of conditioning the latter to preheating and facilitating the separation of the liquid and solid materials.

The invention also includes novel and improved equipment for the carrying out of the process stated.

Figure 1:
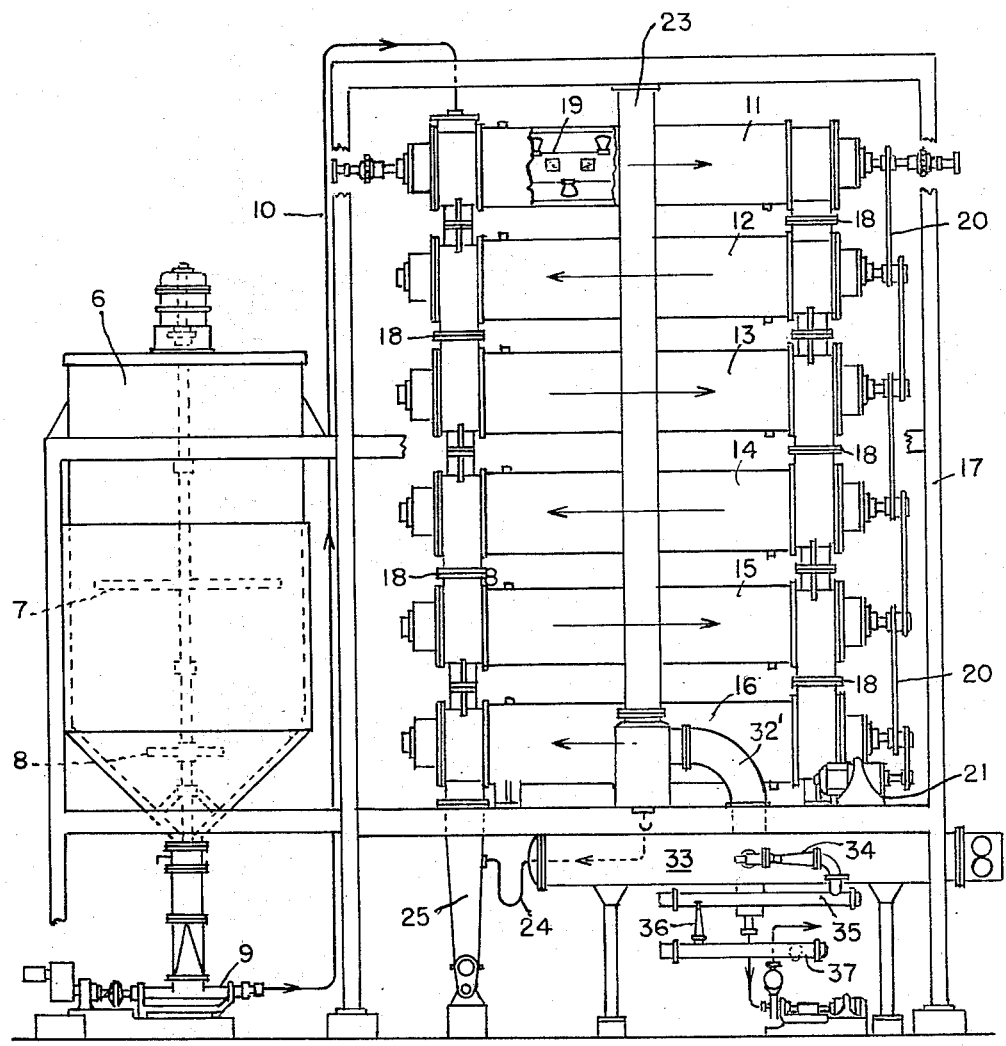
Figure 2:
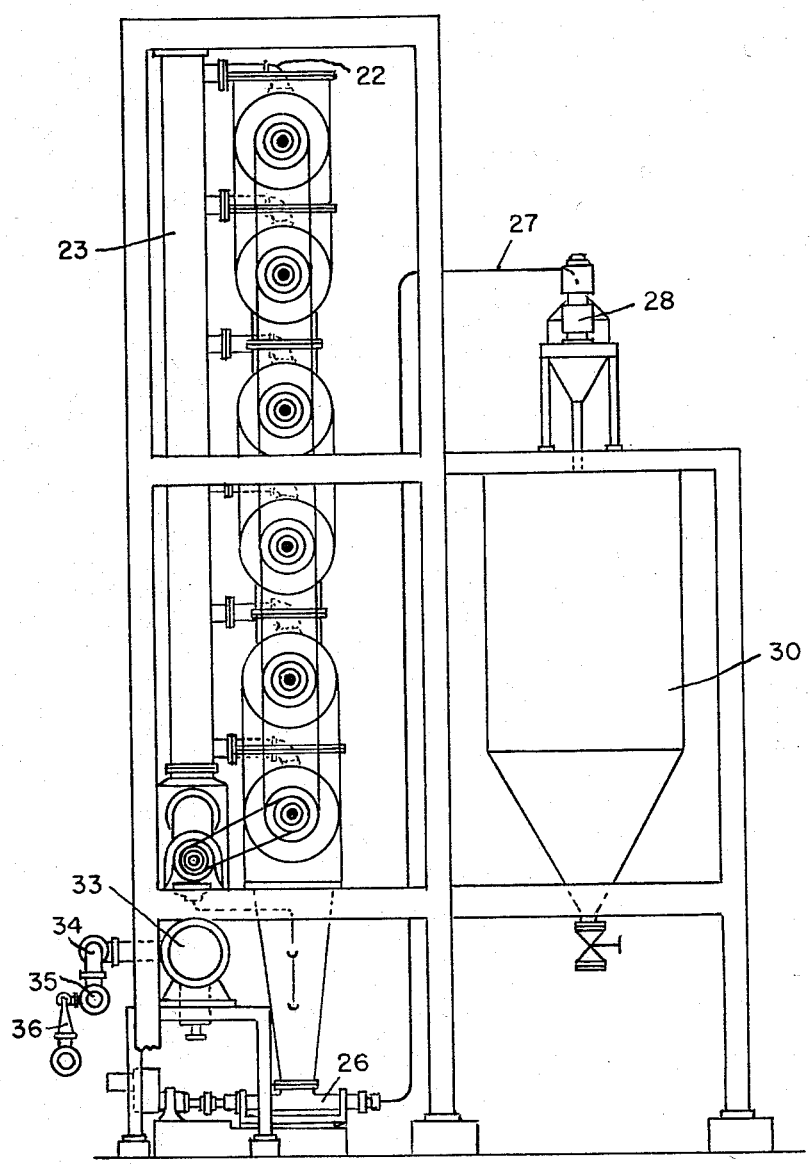

As illustrating the method, the invention has been shown as carried out in appropriate equipment, for example as illustrated on the accompanying drawings in which:

FIGURE 1 is a side elevation of the novel equipment for continuous dry rendering;
FIGURE 2 is an end elevation; and
FIGURE 3 is a plan view of the same.

Briefly stated, the invention resides in mechanically reducing meat scrap, animal tissue, skins, ground bones and the like to a small size suitable for flash heating. The material is then passed through a steam jacketed cooker in which the material is thoroughly agitated and thrown centrifugally and repeatedly as a thin layer or or film against the heated surface. The water vapor and volatile gases are thus evaporated and withdrawn for disposal. The remaining cooked material in the form of an oily slurry is centrifuged to separate the tallow, lard, and oil. The solid residue goes to a product tank where it may be dried if necessary.

An example of suitable equipment has been shown in the drawings in which 6 is a steam jacketed feed tank to receive scraps of meat, animal tissue, skins, ground bone and the like. This feed tank has two motor driven rotary disintegrator-agitators 7 and 8, by which the material is reduced to small size.

The disintegrated, ground up material is then drawn off by gravity from the tank 6 and forms a slurry. This passes through a motor driven pump 9 and a pipe 10 to the evaporator-cooker. The combined evaporator-cooker consists of parallel superimposed horizontal units 11, 12, 13, 14, 15 and 16. These cookers are mounted in parallel in a suitable frame work 17 and connected in succession by chutes 18, 18. The discharge chute from the first unit 11 becomes the inlet chute for the second unit 12. Similar connection is made for each successive pair of units. Each unit is steam jacketed.

Each unit also has a longitudinal rotary beater 19 by which the ground material is advanced and projected centrifugally and repeatedly against the inner wall of the unit. This results in a flash heating at a temperature in the range of 200° F. but not more than the boiling point of water. The units are interconnected by belt drives 20, 20, which in turn are driven by a motor 21.

The top of each unit has a vent pipe 22 connecting to a vertical stack 23. By this means the water vapor and evaporated oils and gases are drawn off as the material is advanced.

Some condensation occurs and the resulting liquids are drawn off at the bottom of the stack 23 through pipe 24 to the discharge 25 from the lowermost evaporator-cooker unit 16.

Discharge pipe 25 leads to motor driven pump 26. The pump discharges the slurry through pipe 27 to a motor driven centrifuge 28. The centrifuge 28 separates the melted tallow, lard and other fatty material for delivery through pipe 29 to a steam jacketed tank 30. This collects the desired fat for final withdrawal.

Pipe 29 has a controller 31 which acts as a by-pass for the discharge through pipe 29. This controller responds to the degree of moisture in the flow. In case this moisture exceeds 0.5 percent, the discharge is by-passed through pipe 32 to the original feed tank 6. There it is mixed with the raw material and facilitates the treatment of the latter in the evaporator-cooker.

Vapors and gases accumulated in stack 23 are drawn off at the bottom discharge 32' into a condenser 33. From there a steam ejector 34 removes uncondensed vapors to a second condenser 35. From the condenser 35, a second steam ejector 36 delivers to a manifold 37. Manifold 37 leads to a furnace or like facility for the combustion of uncondensed gases.

The main purpose of the condensers and ejectors is of course to maintain a vacuum or reduced pressure in the evaporator-cooker.

By means of the equipment assembled as described, the novel method can be carried out in which a disintegrated material is subjected to a flash heating without deteriorating the several types of material present. These materials are separated by the centrifuge 28, so that tallow, lard and analogous liquid products are withdrawn if found to be of satisfactory condition. Incompletely finished material is returned for recycling. The solid material after separation, is in the form in which it is dried and can be used for various purposes such as animal foods, fertilizer and the like.

The apparatus disclosed is illustrative of the method which may be carried out by other equipment.

What I claim is:

1. A method of continuously rendering offal which comprises (1) reducing same to small particle sizes in a distintegrator, (2) flash-heating said distintegrated particles in an evaporator-cooker at a temperature of about 212° F. to form an oily slurry of solids and liquids wherein water and volatile constituents are evaporated from said slurry and (3) subsequently separating the substantially dehydrated oily liquids from the solids and (4) recycling any undehydrated liquids wherein the water is in excess of 0.5% to the evaporator-cooker.

2. The method of claim 1 further characterized in that the reduced particles of offal are flash-heated in the evaporator-cooker at a temperature of about 200° F.

3. The method of claim 2 further characterized in that the reduced particles of offal are flash-heated in the evaporator-cooker under reduced pressure.

References Cited by the Examiner

UNITED STATES PATENTS

| | | | |
|---|---|---|---|
| 1,458,722 | 6/1923 | Offenhauser | 23—280 |
| 1,518,926 | 12/1924 | Hiller | 260—412.6 |
| 1,966,181 | 7/1934 | Lowry | 260—412.6 |
| 2,289,781 | 7/1942 | Hickman | 260—412 |
| 2,551,034 | 5/1951 | Merriman et al. | 23—280 |
| 2,558,869 | 7/1951 | McColm | 260—412 |

CHARLES B. PARKER, *Primary Examiner.*

D. D. HORWITZ, A. H. SUTTO, *Assistant Examiners.*